United States Patent [19]

Davis

[11] Patent Number: 5,377,226
[45] Date of Patent: Dec. 27, 1994

[54] FRACTIONALLY-SPACED EQUALIZER FOR A DS-CDMA SYSTEM

[75] Inventor: Mark E. Davis, Carlsbad, Calif.

[73] Assignee: Hughes Aircraft Company, Los Angeles, Calif.

[21] Appl. No.: 339,961

[22] Filed: Oct. 19, 1993

[51] Int. Cl.⁵ .......................................... H04L 27/30
[52] U.S. Cl. .................................................. 375/1
[58] Field of Search ......................................... 375/1

[56] References Cited

U.S. PATENT DOCUMENTS

| | | | |
|---|---|---|---|
| 5,161,168 | 11/1992 | Schilling | 375/1 |
| 5,208,829 | 5/1993 | Soleimani et al. | 375/1 |
| 5,276,705 | 1/1994 | Higgins | 375/1 |
| 5,280,472 | 1/1994 | Gilhousen et al. | 375/1 |

Primary Examiner—Salvatore Cangialosi
Attorney, Agent, or Firm—Gordon R. Lindeen, III; Terje Gudmestad; Wanda K. Denson-Low

[57] ABSTRACT

An adaptively-tuned filter (80) for use within the receiver (14) of a multiple-access code division (CDMA) communication system permits spectrally-inefficient transmissions to be made from each transmitter (12) used with such system, thereby simplifying the transmitter circuits, yet still achieves a signal-to-noise ratio (SNR) that approaches the SNR achieved when spectrally-efficient transmissions are made. The adaptive filter (80) also compensates for signal distortions resulting from multiple signal paths. The receiver (14) includes RF receiving circuits (60, 62), a matched filter (64), downconversion circuits (66, 68, 92), sampling circuits (70, 71, 72), a time acquisition circuit (76), an adaptive filter (80), a decimator circuit (75), a despreader circuit (77), and an accumulator circuit (78). The adaptive filter (80) includes, e.g., two LMS gradient filters (96a, 96b), or equivalent, that operate independently in parallel, with an accurate bit decision being used to select the tap signals to be used as the starting point for the next bit. The filters (80, 96) function as a fractionally-spaced chip-MSE equalizer that improves the bit-SNR in the presence of sufficient multi-access noise, and also provides narrowband noise rejection.

23 Claims, 5 Drawing Sheets

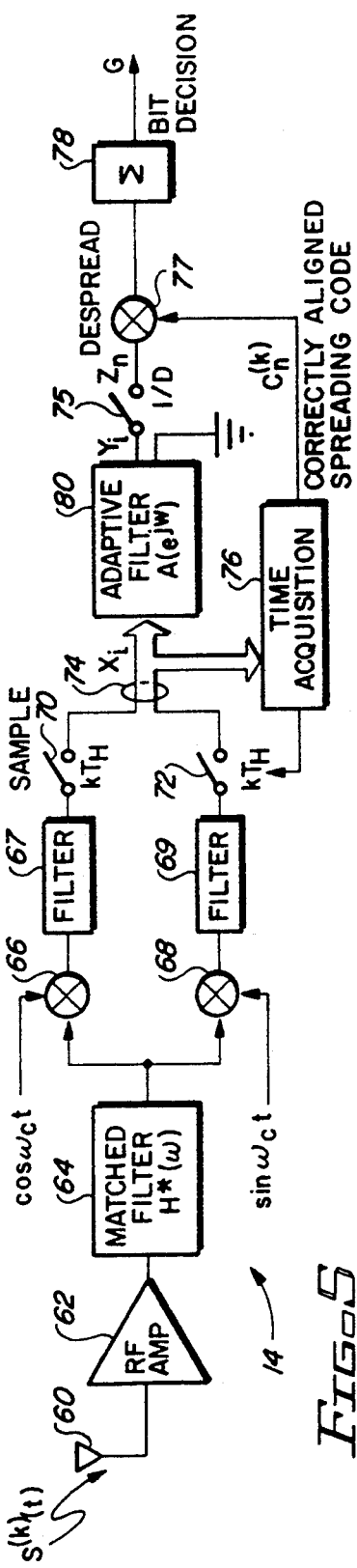
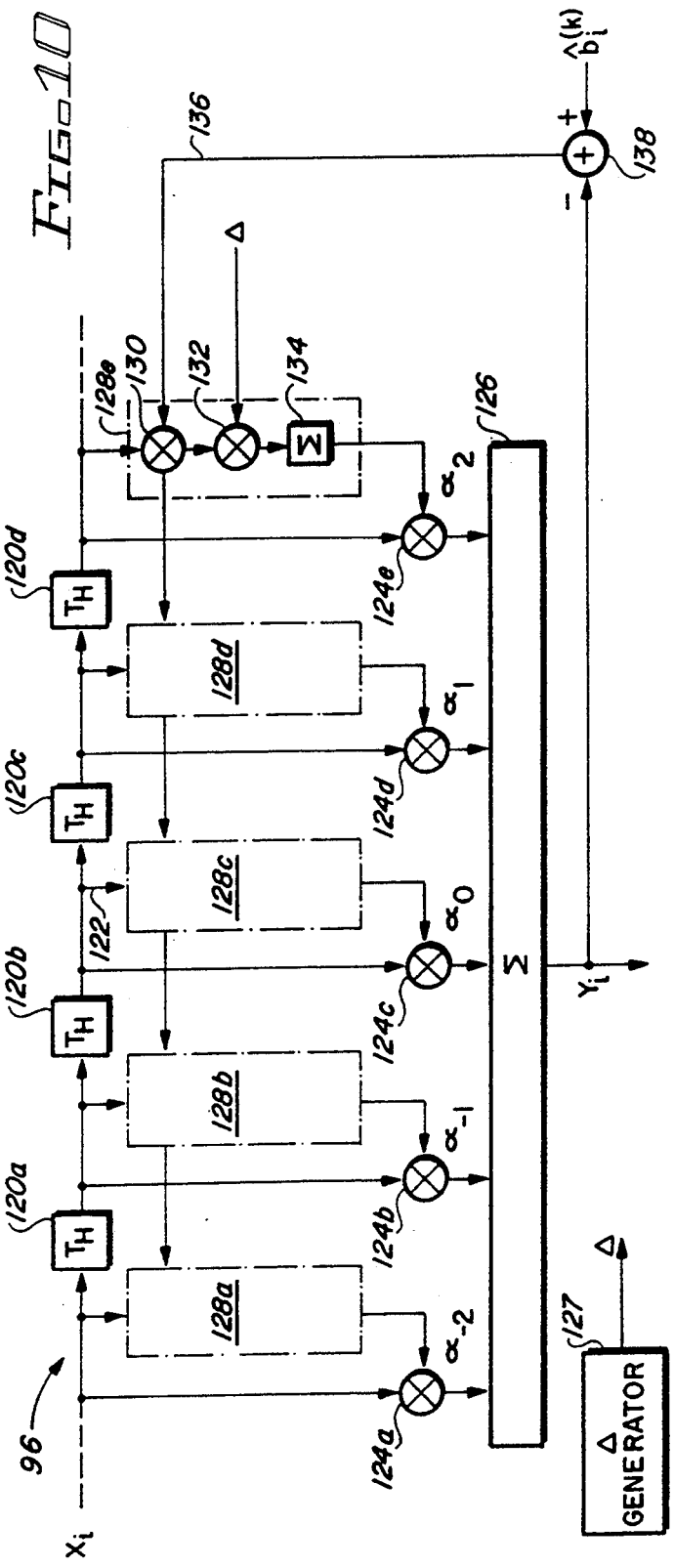

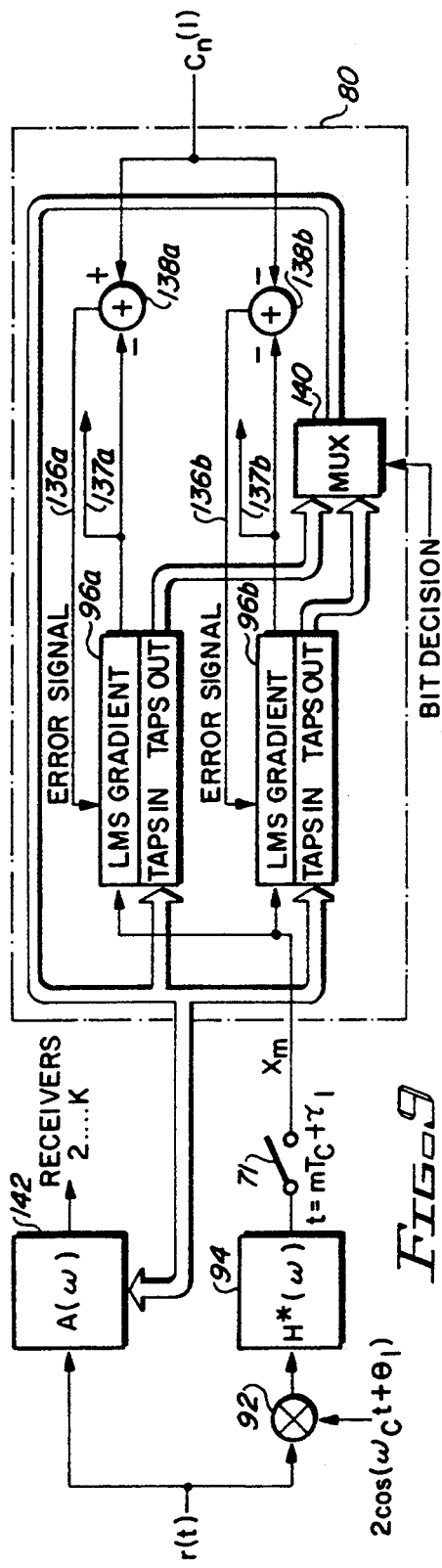
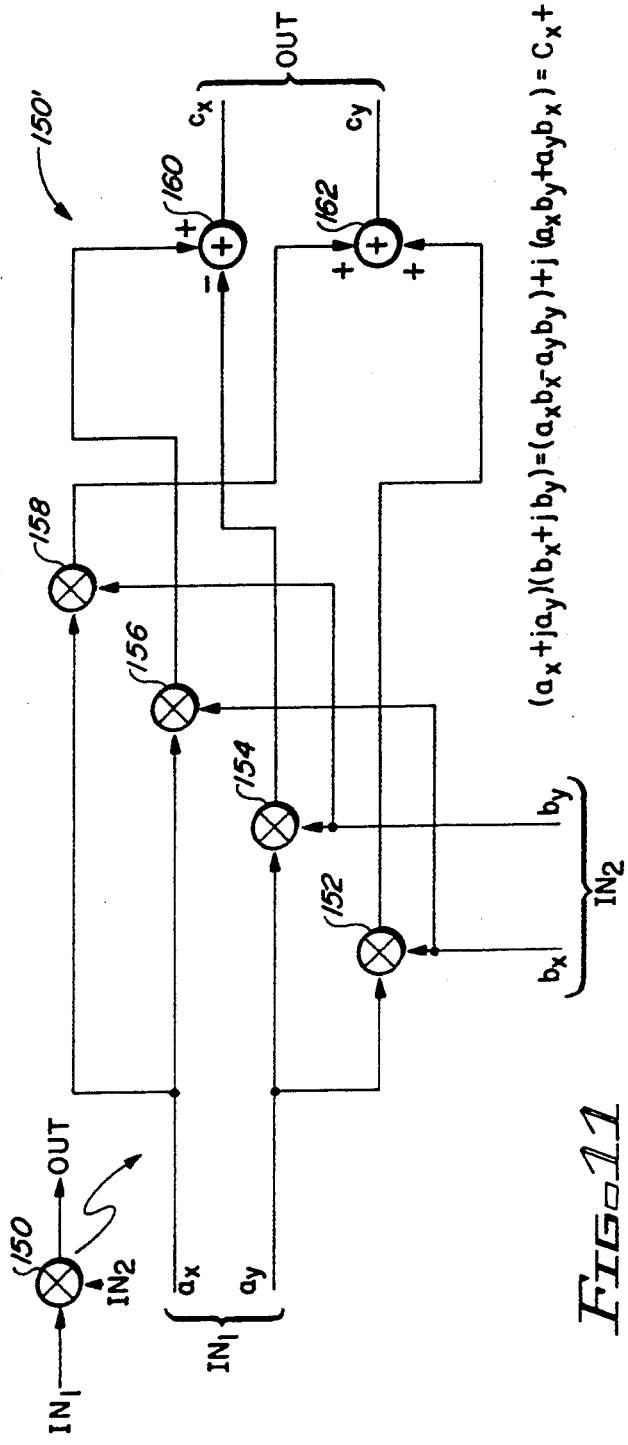

FRACTIONALLY-SPACED EQUALIZER FOR A DS-CDMA SYSTEM

BACKGROUND OF THE INVENTION

The present invention relates to multiple-access communication systems, and more particularly to a multiple-access communication system that utilizes a direct-sequence code-division multiple-access (DS-CDMA) approach, thereby allowing a multiplicity of separate transmitters to efficiently access a stationary base-station receiver.

Multiple-access communication systems are typically designed for use with a relatively large number of separate transmitters (e.g., portable or mobile transmitters) that interface with at least one stationary receiver at one or more designated receiving locations. Such multi-access systems are commonly used with digital cellular telephones, personal communication services, wireless local area networks (LAN's), and the like. Because the receiver(s) of such systems must allow access to a large number of users, each having a transmitter, some means must be used to efficiently interconnect the multiple transmitters to the receiver(s), i.e., to efficiently utilize the available channel spectrum. Common techniques used to allow such multiple access include frequency division multiple access (FDMA), time division multiple access (TDMA), and code-division multiple access (CDMA). The present invention provides multiple access through a CDMA-based communication system.

A simplified model of a CDMA system is as follows: a common carrier frequency, modulated with data having a known bit time, is transmitted to a common receiver from each of several transmitters. All of the transmitters share the same carrier frequency. Thus, all of the transmitters may be tuned to the same RF frequency. Each transmitter has its own low bandwidth information bearing signal having a prescribed data rate or bit rate. This low bandwidth information signal is multiplied by a unique high bandwidth signature waveform, which makes it possible for the receiver to distinguish the desired signal from the other signals transmitted from the other transmitters. For purposes of the present application, it is assumed that the signature waveform consists of a sum of time-offset copies of a waveform called the "chip waveform." The signature waveform may be visualized as the result of convolving the chip waveform with a train of impulses, each of unit area and of positive or negative polarity. The sequence of polarities included within the train of impulses is known in the art as a "spreading sequence" (or "spreading code"). The spreading sequence is unique to each transmitter, but the chip waveform is the same. If, as is common in the art, the spreading sequences appear statistically like random binary sequences, then the power spectrum of the resulting signature sequence is substantially the same as that of the original chip waveform. Thus, each transmitter sends a waveform of similar power spectrum over the channel, and a receiver which has knowledge of a spreading sequence used by a transmitter can distinguish the signal sent by that transmitter on that basis. The unit of time between impulses in the impulse train described above is known as a "chip time", $T_c$ and the reciprocal of this time is known as the "chip rate". The present invention is not limited to the above model of DS-CDMA, but the description is simplified by such a model.

A common problem facing all multiple-access communication systems is accurately detecting the transmitted signal at the receiver after the signal has passed through a noisy channel, i.e., after the transmitted signal has been corrupted with noise. Such noise may include signals from other transmitters, thermal noise, or noise from other sources. A measure of the ability to accurately detect a signal in a noisy environment is the signal-to-noise ratio (SNR), defined as the ratio of the power of the desired signal divided by the power of all other undesired signals, measured at the final signal which is used to make a decision about the information bearing signal. A high SNR indicates that the integrity of the signal, when received at the receiver, has been more or less preserved, thereby enabling the individual bits of the signal to be detected above the noise with a low probability of error. It is thus a common objective of any communication system, including multiple-access communication systems, to achieve a high SNR, despite the noisy channels and mediums through which the transmitted signal may traverse as it propagates from the transmitter to the receiver.

In a DS-CDMA system, the transmitted signal is not only subject to additive white Gaussian noise (AWGN), a common form of noise in most communication channels, but is also subject to "multiple-access noise", i.e., noise resulting from the presence of other users who are transmitting at the prescribed carrier frequency and bit rates, but with different signature waveforms. To minimize the effect of the AWGN, it is known in the art to implement the receiver of a DS-CDMA system as a filter matched to the signature waveform of the user (transmitter) of interest. Unfortunately, such matched filter, while optimum for minimizing probability of bit error in AWGN, performs poorly when significant multiple-access noise is present. Thus, what is needed is a type of filter for use within a DS-CDMA receiver that performs acceptably in the presence of significant multiple-access interference.

An optimum multi-user receiver that minimizes multi-user noise is known. However, such optimum multi-user receiver is extremely complex. Numerous sub-optimal simplifications of such optimal structure have been proposed, however, such "simplifications" still require locking and despreading of some or all of the interfering signals, and hence also represent substantially complex circuitry. Thus, the matched filter receiver, despite its limitations, represents the most common method in practice.

Another form of channel distortion frequently encountered with multiple-access communication systems are signal reflections, or having the same signal traverse multiple paths as it arrives at the receiver. Channel distortion caused by multiple paths is commonly dealt with in the prior art by utilizing a RAKE receiver. The term "RAKE" receiver has been coined in the art, to describe the finite length impulse train which results from such receiver when an impulse is applied to the input. The impulse response, when graphed, looks like the teeth of a garden rake.) A RAKE receiver includes a delay line, or a series of delay elements, with signal taps being provided after each delay. The tapped signals are then appropriately combined with other signals, through feedback and feedforward connections, in order to minimize the effects of channel distortion.

The main source of noise in a typical CDMA system is multiple-access noise, which has a power spectrum similar to that of the signal of interest. Thus, a RAKE receiver must have signal taps spaced such that this power spectrum is flat (uncorrelated) when aliased at the tap rate. Such a limitation may significantly encumber the operation of the RAKE receiver, especially when there is significant excess bandwidth (i.e., a significantly non-flat transmitted power spectrum). This is especially likely to be the case for high bandwidth CDMA systems, owing to the difficulty of generating a flat-spectrum chip waveform at very high rates. What is needed, therefore, is an improved receiver that performs the function of the RAKE receiver, thereby compensating for channel distortion, but which does so without the tap spacing limitations of the prior an RAKE receivers.

SUMMARY OF THE INVENTION

The present invention provides a DS-CDMA system that advantageously addresses the above and other needs. A DS-CDMA communication system made in accordance with the invention includes a multiplicity of transmitters and at least one receiver. Each transmitter transmits its outgoing DS-CDMA signal using a spectrally inefficient power spectrum, i.e., a non-flat power spectrum, thereby simplifying the circuitry used within the transmitter, and allowing the transmitter to be less expensive and smaller than spectrally-efficient CDMA transmitters. The receiver receives the transmitted CDMA signal and operates thereon on a bit-by-bit basis, i.e., bit decisions are based on observation of the received waveform over approximately one bit time in the absence of knowledge of the other users' (transmitters') spreading codes, chip timing, and carrier phase.

The receiver includes a matched filter and an adaptive linear filter. The matched filter is designed to have a frequency response that matches the power spectrum of the transmitted CDMA signal. The adaptive linear filter is configured to make the SNR for the spectrally-inefficient signature waveforms received from the transmitter approach asymptotically the SNR that would be received from a spectrally-efficient transmitted signal, at high signal to thermal noise ratios. Advantageously, because CDMA systems typically operate in a situation of high multiple-access noise and low thermal noise, this asymptotic result may be nearly realized in practice. Hence, the DS-CDMA system of the present invention advantageously simplifies the task of the transmitter (allowing transmission of spectrally-inefficient signature waveforms) while attaining a SNR performance nearly as good as spectrally-efficient spreading of the same bandwidth. Further, the use of the adaptive linear filter makes the system highly resistant to narrowband noise.

In accordance with one aspect of the invention, the adaptive linear filter utilized by the DS-CDMA receiver is a discrete time filter. The incoming RF signal, after passing through the matched filter, is downconverted in quadrature, providing a complex series signal. The complex series signal is then passed through the adaptive linear filter. Such filter advantageously allows the SNR to be nearly maximized when the number of CDMA users (i.e., the number of transmitters) is large (more than about 5 to 10). The adaptive filter includes a sequence of delay elements that delay the incoming signal by a prescribed amount. The delay may be a one-sample delay, thereby facilitating implementation of the adaptive filter using a digital processor. In other embodiments, the delay may be realized using an analog delay line, in which case the delay provided is for a fixed time increment. Signal tap points are provided after each delay, and the delayed signal from each tap, as well as the incoming signal, are multiplied by appropriate "tap weight" signals, or tap coefficients, and then summed. The tap coefficients are adaptively adjusted, using feedforward and feedback components of the incoming and delayed signals, so as to produce the set of tap coefficients that approximately maximize the average SNR.

In accordance with a further aspect of the invention, the tap coefficients of the linear filter are adaptively tuned in a way that compensates for distortion, e.g., caused by multiple signal paths, that occurs in the transmitted signal en-route to the receiver.

In accordance with yet another aspect of the invention, a minimum chip-MSE (mean square error) equalizer, or a fractionally spaced equalizer, is utilized to improve the bit-SNR in a system with sufficient multiple access noise.

In accordance with still another aspect of the invention, two parallel adaptive linear filters may operate simultaneously, one assuming positive data and the other negative. Such parallel configuration thus does not require that reliable chip decisions be available. At the end of a bit time, a bit decision selects a set of tap signals that will serve as the starting point for the next bit.

In accordance with another aspect of the invention, after the signal has passed through the adaptive linear filter, at a rate which is defined by the sampling or delay period of the filter, the filtered signal is decimated by an appropriate factor to yield a series signal (at a rate defined by the chip rate) that enables the chip sequence included within the bit interval to be discerned. The chip sequence is then despread and summed to provide an output signal from which an appropriate decision statistic for the bit interval can be rendered.

Thus, one embodiment of the invention may be characterized as a direct-sequence multiple-access code division (DS-CDMA) communication system. Such system includes a multiplicity of separate transmitters and at least one base-station receiver. Each of the mobile transmitters includes: (a) means for producing a unique binary spreading sequence; (b) means for generating from such binary spreading sequence a unique signature waveform, said unique signature waveform having a bandwidth substantially corresponding to an allowed channel bandwidth, and a non-flat power spectrum which rolls gradually at the band edges; (c) means for generating a low bandwidth analog baseband waveform signal encoded with digital data that is to be transmitted; (d) means for multiplying the unique signature waveform with the low bandwidth analog baseband waveform to yield a direct sequence spread waveform signal; (e) means for modulating a common RF carrier signal with the direct sequence spread waveform signal; and (f) means for transmitting the modulated RF carrier signal.

The base-station receiver of such communication system comprises: (a) means for receiving the transmitted modulated RF carrier signals from each of the multiplicity of transmitters, including matched filter means and quadrature downconversion means, (b) adaptive filter means for filtering the modulated RF carrier signal to maximize the SNR, compensate for the non-flat power spectrum of the signature waveform, and compensate for signal distortions, (c) despreading means to despread the filtered signal in order to identify a particular signature waveform contained therein, and (d) an integrator, or summing means, to integrate such signal over a bit time to determine the informational content thereof, i.e., whether such integrated signal represents a logical "1" or a "0".

The adaptive filter means, which forms a key element of the invention, includes a sampling circuit connected to sample the waveform signal, after downconversion, at a specified sampling rate, e.g., the Nyquist rate. Because the downconversion occurs in quadrature, such sampling circuit provides a complex signal at its output (i.e., a signal having real and imaginary components). The adaptive filter then receives the sampled complex waveform signal and generates a filtered output signal therefrom as a function of a specified transfer function. The specified transfer function compensates for the non-flat power spectrum of the selected one of the transmitted waveform signals and also compensates for channel distortions that may distort the transmitted waveform signal while en-route to the receiver.

Another embodiment of the invention may be characterized as an adaptive filter for use within a receiver of a CDMA communication system that includes first and second fractionally-spaced equalizers, each of which operates independent of the other to make a bit decision. One of the bit decisions is selected as the correct bit decision, and the tap signals from such equalizer are then used to influence the bit decision to be made for the next bit.

It is thus a feature of the present invention to provide a simplified DS-CDMA system that achieves a high SNR, despite the noisy channels and mediums through which the transmitted signal traverses as it propagates from the transmitter to the receiver, and despite signal or channel distortion that may be present due, e.g., to multiple signal paths.

It is an additional feature of the invention to provide a DS-CDMA receiver that utilizes one or more fractionally spaced equalizer circuits on a chip level to compensate for spectral inefficiency, implement a non-aliasing RAKE, and reject narrowband noise.

It is another feature of the invention to provide such a DS-CDMA system that simplifies the transmitter circuits by eliminating the need for flat-spectrum pulses, and instead allows a transmitted pulse shape with a rounded spectrum.

It is a further feature of the invention to provide such a simplified DS-CDMA system that includes a receiver which compensates for a spectrally-inefficient shape of the transmitted pulse, which compensation provides a SNR that approximates that which could be obtained using a spectrally-efficient shape.

It is an additional feature of the invention to provide an adaptive filter for use within a DS-CDMA receiver that performs acceptably in the presence of significant multi-access noise.

It is another feature of the invention to provide a receiver for use within a CDMA system that uses a minimum chip-MSE equalizer to improve bit-SNR in the presence of sufficient multiple access noise.

It is an additional feature of the invention to provide a CDMA receiver that performs the multipath mitigation function of a RAKE receiver, but which does so before aliasing occurs.

It is yet another feature of the invention to provide a practical, economical DS-CDMA receiver structure that nearly maximizes the SNR, improves the probability of error, is highly resistant to narrowband noise, and makes bit decisions based on observation of the received waveform over one bit time in the absence of knowledge of the other users' (transmitters') spreading codes, chip timing, and carrier phase.

BRIEF DESCRIPTION OF THE DRAWINGS

The above and other aspects, features and advantages of the present invention will be more apparent from the following more particular description thereof, presented in conjunction with the following drawings wherein:

FIG. 5 is a simplified functional block diagram of a CDMA receiver;

FIG. 9 shows a block diagram of a CDMA system made in accordance with the present invention;

FIG. 10 shows a block diagram that shows the internal detail of one of the LMS gradient filters of FIG. 9; and FIG. 11 depicts how complex signals are multiplied within an adaptive filter made in accordance with the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
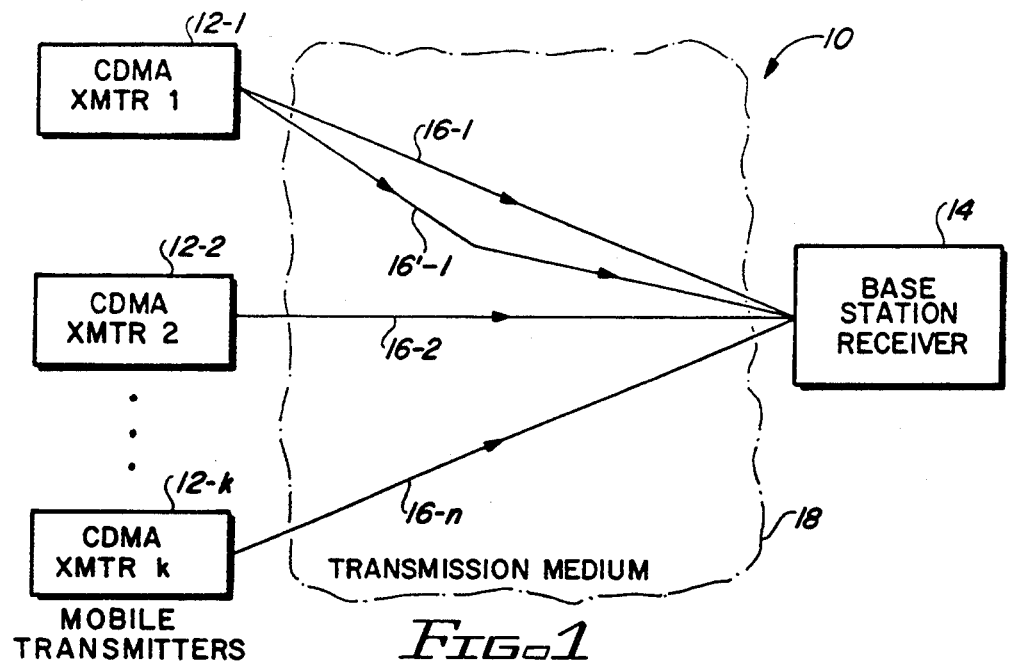
FIG. 1 illustrates the concept of mobile-to-base communications utilized by a DS-CDMA communication system.

Referring first to FIG. 1, there is shown a communications system 10 that includes a plurality of mobile transmitter units 12-1, 12-2, . . . 12-k (any one of which may hereafter be referred to as the transmitter 12 or transmitter unit 12), and a single base-station receiver 14. Each of the transmitter units 12 is configured to transmit a signal that is modulated in accordance with a code-division multiple access (CDMA) scheme, as explained more fully below. The transmitted CDMA signals propagate, along respective signal paths 16-1, 16-2, ... 16-k (referred to generically hereafter as the signal path 16), through a transmission medium 18, and are received at the base-station receiver 14. The transmission medium 18 may also be referred to as the communication channel. While a single signal path may exist from each transmitter 12 through the medium 18 to the base-station receiver 14, it is not uncommon for multiple signal paths to exist, e.g., due to reflections of the transmitted signal, such as the signal path 16'-1 in FIG. 1. As a result, a given transmitted signal may arrive at the base-station 14 through different signal paths. Such different signal paths may introduce significant channel distortion of transfer function $D(\omega)$ into the signal received at the base-station receiver. The present invention advantageously recognizes when such signal distortion is present and acts accordingly.

For many applications, the transmitter units 12 are mobile, as in a digital cellular telephone system. Hence, hereafter the system 10 may be referred to as a mobile-to-base station communication system. However, it is to be understood such description is only exemplary and that the transmitter units 12 need not be mobile.

The medium (or channel) 18 introduces noise into the transmitted signals received at the base-station 14. Additionally, there may be narrowband interference from a nearby narrowband communications system, or from hostile jamming. A major source of interference in a CDMA system is noise from other users of the system, known in the art as multiple-access interference. An important feature of the receiver 14 of the present invention is to alleviate the effects of such multiple-access noise, and to be highly resistant to narrowband noise, as well as to increase the signal-to-noise ratio (SNR) so that the transmitted signals can be detected at the receiver 14 with a low probability of error.

All efficient communication systems, such as the mobile-to-base station system shown in FIG. 1, utilize some technique for maximizing the channel efficiency, i.e., for maximizing the number of users (i.e., transmitter units) that may communicate through the system 10 without interfering with each other. As indicated in the above background discussion, many different "multiple use" schemes are known in the art. Such multi-access schemes include, for example, frequency division multiple access (FDMA) wherein each user is assigned a different transmission frequency; time division multiple access (TDMA), wherein each user transmits a signal that occupies a different time slot or space; and code-division multiple access (CDMA), wherein each user transmits a signal at the same frequency and time, but wherein each information-bearing signal is further encoded with a unique signature waveform. The communication system 10 of the present invention utilizes a CDMA scheme, and is particularly suited for a CDMA scheme that operates at a high data rate, although the invention may be used with any CDMA scheme, e.g., a CDMA-based cellular telephone system.

Figure 2:
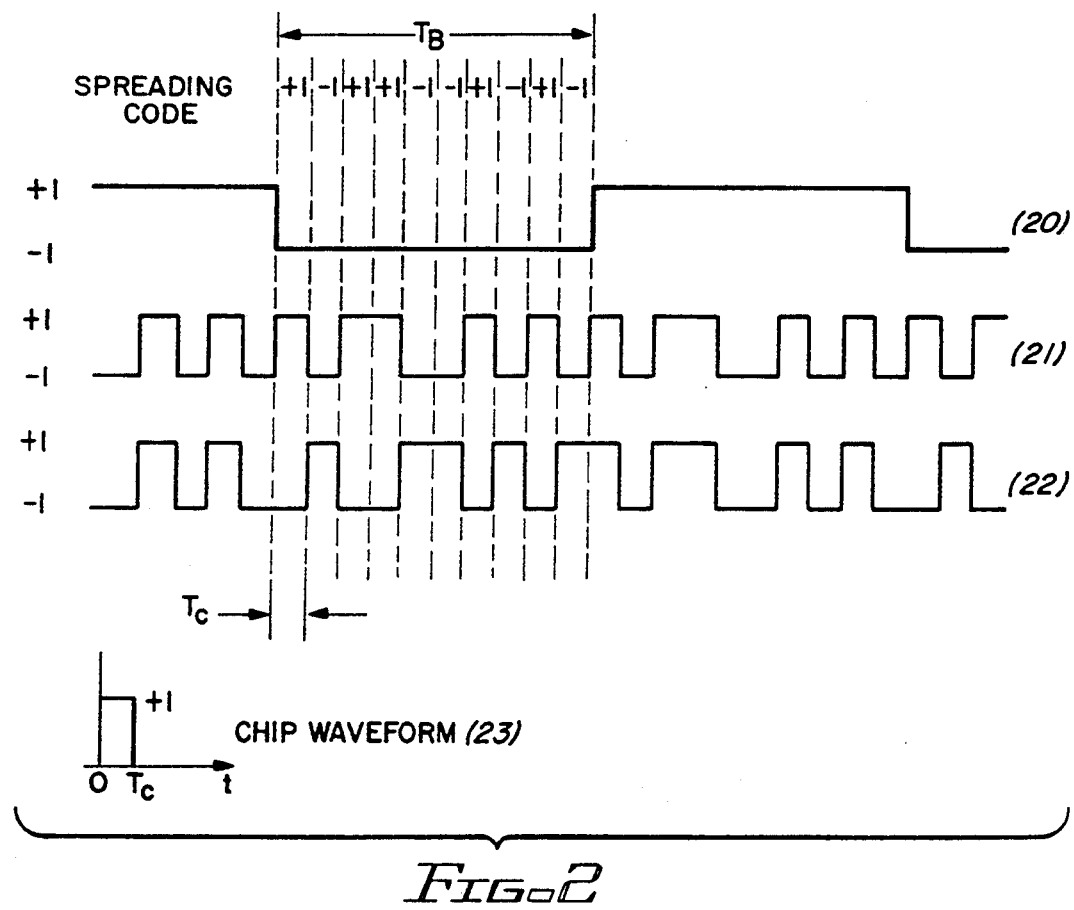
FIG. 2 functionally depicts the concept of code-division multiple access (CDMA); showing how a CDMA signal made up of a plurality of chips at a chip time $T_c$ is used within each bit time, $T_B$, of a data signal.

The basic concept of CDMA modulation is taught with respect to FIG. 2. Shown in the upper portion of FIG. 2 is a data waveform 20 that includes a plurality of bit times, $T_B$. For purposes of FIG. 2, the waveform 20 is shown as a function of time and amplitude, with time being the horizontal axis, and amplitude being the vertical axis. The waveform 20 thus includes a sequence of data bits, each of duration $T_B$, with each bit being either a digital "1" or a "0". A sequence of bits of a prescribed length (number of bits) is referred to as a digital "word". Typically, for most digital communication systems, a sequence of digital data words must be transmitted in a prescribed format in order to identify a particular user, and in order to provide other control and management information. For example, a cellular telephone system usually requires that each mobile transmitter transmit several informational words, each of a known or prescribed length, e.g., 48 bits. Even voice signals that are transmitted from the mobile transmitters to the base-station receiver once acquisition has been achieved and all the necessary control and management signals have been sent, may be converted to digital words prior to transmission. The waveform 20 thus comprises the low bandwidth information bearing signal. Only two complete bits of such information bearing signal are shown.

For clarity, the digital waveform 20 shown in FIG. 2 is depicted in an NRZ (non-return-to-zero) format (where a logical "1" maps to a $-1$ normalized amplitude, and a logical "0" maps to a $+1$ normalized amplitude). It is to be understood, however, that such representation is only exemplary. In practice, the information bearing signal 20 may be encoded in any appropriate manner, e.g., with Manchester (biphase) encoding, in order to shift the power spectral density of the transmitted waveform away from zero, or for other purposes.

In a CDMA scheme, each bit of the digital waveform 20 is further subdivided into a plurality of "chip times", $T_c$, as shown in the lower portion of FIG. 2. Typically, there is a large number of chip times within each bit. About 127 to 255 chips per bit is typical. The signature waveform consists of a square-wave binary waveform signal 21 which assumes the value of $+1$ or $-1$ in each chip-time interval $T_c$. The value assumed by the signature waveform during each interval $T_c$ is determined by the successive values of the binary spreading sequence (code) for a particular user. The signature waveform 21 is multiplied by the information bearing signal 20 to yield a direct sequence spread waveform 22.

For the example shown in FIG. 2, there are ten chips per bit. A chip waveform 23 comprises a rectangular (in time) pulse of duration $T_c$ and amplitude 1. The signature waveform signal 21 is obtained by repeating the chip waveform 23 at $T_c$ intervals, each occurrence being multiplied by successive elements of the spreading code $\{+1, -1, +1, +1, -1, -1, +1, -1, +1, -1\}$, with the spreading code being repeated each bit time $T_B$. The information bearing signal 20 is multiplied by the signature waveform 22 to yield the direct sequence spread waveform. Thus, when the data bit is a logical "1" (or a $-1$ amplitude as shown in FIG. 2), the direct sequence spread waveform 22 comprises the inverse of the signature waveform 21. When the dam bit is a logical "0" (or a "$+1$" amplitude as shown in FIG. 2), the direct sequence spread waveform 22 is the same as the signature waveform 21.

Each separate transmitter 12 (FIG. 1) is configured to uniquely encode each bit time with a particular signature waveform. Such signature waveform thereafter serves to uniquely identify the bit as having originated from a particular transmitter. Thus, when multiple transmitters are used, and multiple bits are thus in the transmission medium at any given time, each bit carries its own unique signature waveform, which unique signature waveform may be considered as an "identification tag" that identifies the particular transmitter from which the bit originated. The presence of such "identification tag" thereafter conceptually provides a means for sorting all the bits received at the base-station receiver 14 so that the receiver processing circuits can determine which received bit signals came from which transmitters, thereby enabling multiple users to use the system at the same time.

A significant advantage of a CDMA-based system is that the transmitter units may operate asynchronously. Asynchronous operation significantly reduces the complexity of the transmitter circuits as compared, e.g., with a TDMA-based system where careful synchronization between all of the transmitters is required. Moreover, in a CDMA-based system, the transmitter units 12 may all operate at the same carrier frequency. Hence, the individual transmitter units 12 need not be individually tuned to a specific operating frequency, and can share the same transmission bandwidth with other transmitter units. Such bandwidth sharing and avoidance of individual tuning significantly reduces the cost of manufacturing and maintaining the mobile transmitter units 12. The present invention retains this important advantage of a CDMA-based system.

Figure 3A:
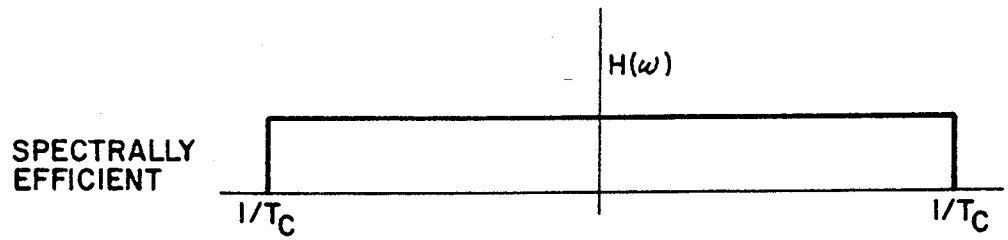
FIG. 3A conceptually illustrates a spectrally efficient power spectrum for use by a CDMA transmitter, as is commonly used in the prior art; and a FIG. 3B illustrates a spectrally inefficient power spectrum, as is used by the present invention.

The present invention further simplifies the design, and hence the cost of manufacture and maintenance, of each transmitter unit 12 in that the transmitter unit 12 need not operate in a spectrally efficient manner. As explained previously, spectrally-efficient CDMA systems have heretofore transmitted their direct sequence spread waveform using a fiat power spectrum in order to improve the SNR of the received signal, e.g., by using signature waveforms constructed as shown in FIG. 2, where the chip waveform is a sinc shape, with a rectangular spectrum occupying the entire allowed band. To transmit fiat-spectrum pulses requires the use of output circuitry within the transmitter unit, e.g., an output filter, that has a frequency response substantially as shown in FIG. 3A. Disadvantageously, such output circuitry, if optimum, is very complex and expensive.

Perhaps the chief disadvantage of the fiat-spectrum chip waveform is its duration in the time domain. It can be shown that the inverse Fourier transform h(t) of a frequency response H($\omega$) as shown in FIG. 3A only decays as $1/t$. Thus, each pulse is significantly different from 0 over a large number of chip intervals $T_c$ in both directions from the center. This complicates the production of an accurate approximation of h(t). For example, for low bandwidth spread systems, a reasonable method of producing h(t) is to use a digital finite impulse response (FIR) filter with an impulse response shaped like h(t) but sampled at fractions of $T_c$. The result, when passed through a suitable digital-to-analog (D/A) converter looks like h(t) with stair-step edges, which stair-step edges may then be filtered off. However, the duration of the digital FIR filter must be large to generate an accurate representation of h(t) because of the pulse's long duration in the time domain. Thus, long duration in the time domain of the chip pulse is a significant disadvantage, and use of the digital FIR filter is limited to low chip rates.

Figure 3B:
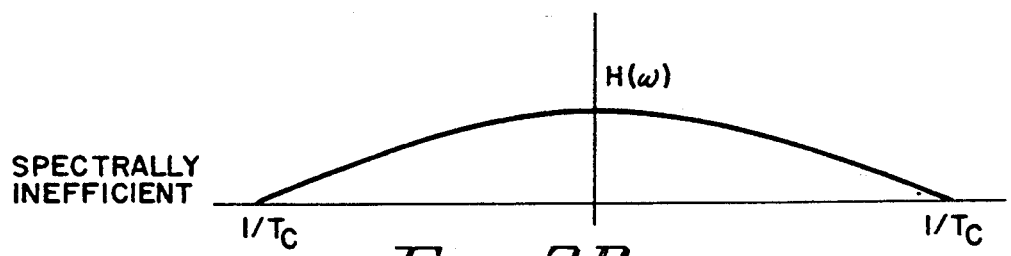

In contrast to the spectrally efficient transmission of flat-spectrum chip waveforms in prior CDMA transmitter units, the present invention utilizes a spectrally inefficient transmission, having a rounded shape as shown generally in FIG. 3B. Such spectrally inefficient transmission may be realized, e.g., by using a digital circuit to generate square-wave chips, (where a "chip" is defined here to be the spreading-code modulated chip waveform, with $T_c$ as the chip time), and then passing the chips through an analog low-pass filter with cutoff at the first spectral null of the square-wave. Such a transmitter is extremely simple and can operate at chip rates in excess of 100 MHz. Further, due to its simplicity, such a transmitter is significantly less expensive.

Figure 4:
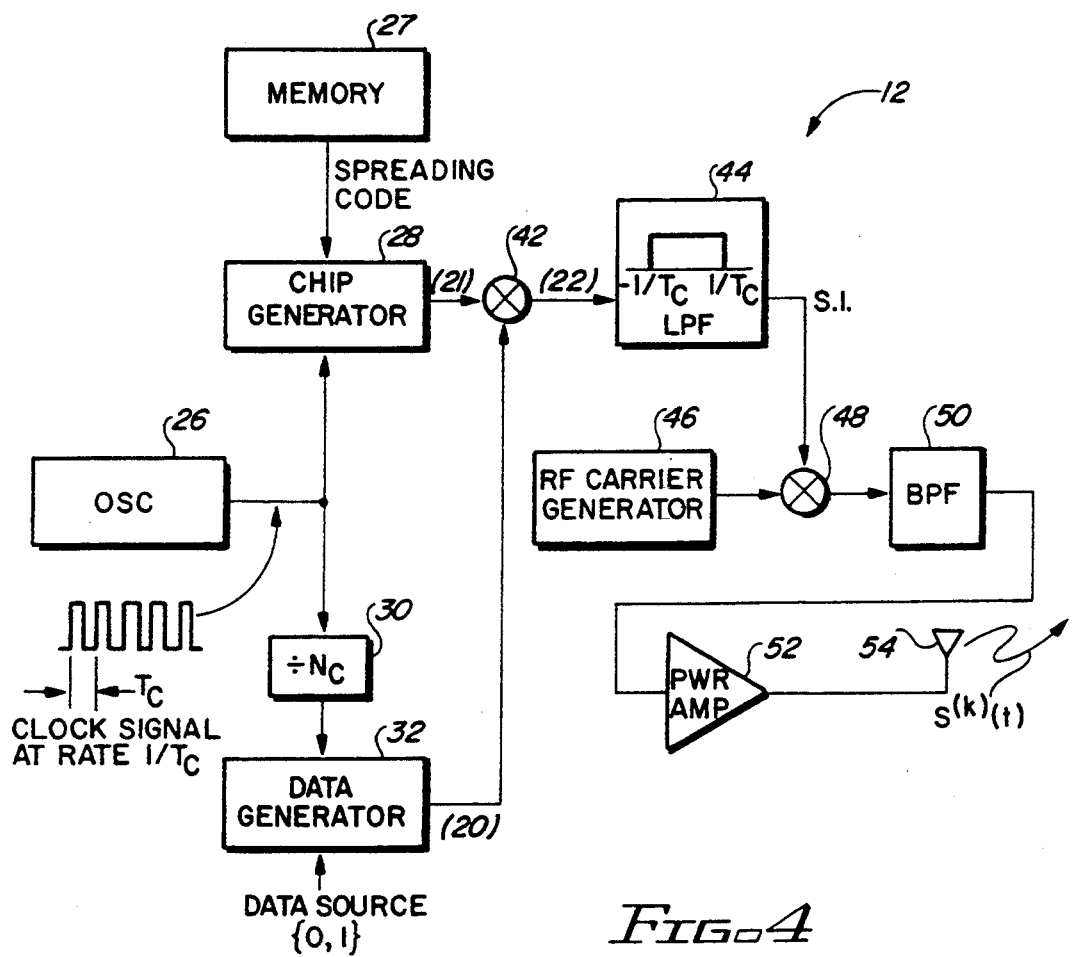
FIG. 4 is a simplified functional block diagram of a CDMA transmitter.

A simplified functional block diagram of a CDMA transmitter unit 12 that transmits in a spectrally inefficient manner in accordance the present invention is shown in FIG. 4. It is to be emphasized that such diagram is functional in nature, and that the individual blocks included in such block diagram may, in practice, be realized in numerous ways and forms, including dedicated hardware circuits, adaptive hardware circuits controlled by firmware, processor circuits controlled by a suitable control program (software control), or combinations of such hardware, firmware and software.

As seen in FIG. 4, the transmitter unit 12 need only include an oscillator 26 that generates a basic clock signal at a rate $1/T_c$ from which the bit time $T_B$ can be derived. Typically, the oscillator 26 operates at the chip time, so that the period of the oscillator is the chip period, $T_c$. The clock signal generated by the oscillator 26 thus drives a chip generator 28, with the chip generator 28 being configured to generate a chip waveform signal 22 that is unique to the transmitter 12. A memory 27 (which may be included as part of the chip generator 28, but is shown separately in FIG. 4 for clarity), or equivalent circuitry, contains the spreading code from which the signature waveform signal 21 is derived. The clock signal generated by the oscillator 26 is also divided by an integer $N_c$ by a dividing circuit 30, where $N_c = T_B/T_C$ represents the number of chips per bit. The resultant signal, after division by $N_c$, is then used to drive a data generator 32. The data generator 32 is modulated with a suitable data source in order to generate an information bearing signal 20.

The signature waveform signal 21 output from the chip generator 28 is then multiplied by the information bearing signal 20 output from the data generator 32 using a suitable multiplier circuit 42, or equivalent modulator. Where the signature waveform signal 21 and the information bearing signal are digital logic signals that assume values of "1" or "0" to represent the binary signal, a simple modulator may be realized using an Exclusive OR gate. Where the signature waveform signal 21 and the information bearing signal are signals that assume values of "+1" and "−1" to represent binary data, as shown in FIG. 2, then a simple modulator is a multiplying circuit.

Once the signature waveform signal 22 has been incorporated into the information bearing signal 33 through the modulation circuitry 42, the resulting combined signal is passed through a suitable low pass filter (LPF) 44 having a cutoff frequency at the first spectral null of the chip pulse generator signal. The output of this LPF has a rounded power spectrum in the band $\pm 1/T_c$, shaped as the main lobe of a sinc-squared function, and is thus spectrally-inefficient (S.I.) as discussed above. Such S.I. signal, which is now an analog signal, modulates an RF carrier signal, generated by an RF generator 46, in conventional manner using a conventional RF modulator circuit 48. Typically, some form of digital modulation may be used, such as DSB-AM (double side band amplitude modulation), which may be realized in its simplest form by multiplying the sequence by the RF carrier. Other types of modulation may also be used. The resulting signal is passed through a bandpass filter (BPF) 50, to remove unwanted side-bands, amplified in a power amplifier 52, and then transmitted through a suitable broadcast antenna 54. The transmitted signal, $S^{(k)}(t)$, is thus an RF signal modulated with the information bearing signal 20, each bit of which is further modulated with the chip waveform signal 21.

Referring next to FIG. 5, a simplified functional block diagram of the base-station receiver 14 is depicted. The base-station receiver 14 includes a suitable receiving antenna 60 through which the transmitted signal $s^{(k)}(t)$ is received. Such received signal is first amplified and filtered using an RF amplifier 62. Next, the amplified RF signal is applied to a matched filter 64.

The matched filter circuit 64 is designed to match the frequency response of the incoming spectrally inefficient chip waveform included in each bit of the information bearing signal 20 included within the incoming signal $s^{(k)}(t)$. Thus, the frequency response of the matched filter 64 has a general rounded shape, as shown in FIG. 3B. The design of the matched filter 64 may be conventional.

Next the filtered signal is downconverted in order to remove the carrier frequency therefrom. Assuming a carrier frequency of $\omega_c$, downconversion is accomplished by splitting the filtered signal into two parallel signal paths. In a first signal path, the signal is multiplied by $\cos(\omega_c t)$ in a multiplier element 66. In a second signal path, the signal is multiplied by $\sin(\omega_c t)$ in a multiplier element 68. As is known in the art, such multiplication creates upper and lower sidebands, the lower sideband of which represents the incoming signal with the carrier frequency stripped therefrom. Hence, appropriate anti-aliasing filters 67 and 69 remove the unwanted sidebands, leaving the desired information bearing signal transmitted from the transmitter unit 12. Such filters 67 and 69 should have a cutoff frequency of $\pm 1/(2T_H)$, thereby providing a total bandwidth of $1/T_H$, which is defined as the channel bandwidth. In the frequency domain, the shape of the anti-aliasing filters 67 and 69 is rectangular, with unit gain between $-1/(2T_H)$ and $+1/(2T_H)$, and zero elsewhere.

Downconversion in the manner depicted in FIG. 5 is referred to as quadrature downconversion, and the resulting downconverted signal is a complex signal, i.e., two signals having a specific phase relationship to each other. Mathematically, such downconversion can be modeled as yielding a complex signal, having real and imaginary components. The real component corresponds to the signal being processed along one signal path, and the imaginary component corresponds to the signal being processed along the other signal path.

After downconversion, both signals, i.e., both components of the complex signal, are sampled at an appropriate sampling rate, e.g., at least the Nyquist rate. Thus, one signal path includes a sampler 70 that samples the signal every $kT_H$ seconds, and the other signal path likewise includes a sampler 72 that samples the signal every $kT_H$ seconds. It is assumed here that $1/T_H$ is an integer multiple of $1/T_C$. Such sampled signals thus create a complex set of series signals referred to as $x_i$. For simplicity, hereafter, references to the parallel quadrature paths in the receiver will be made as though they were a single complex-valued signal. However, it is to be understood that such signals must physically consist of two separate real-valued signals passed along separate signal paths. In FIG. 5, such separate signal paths are shown as two parallel signal paths 74.

The sampled signal $x_i$ is directed to both an adaptive filter 80, having a transfer function $A(e^{j\omega})$, and to a time acquisition circuit 76. The time acquisition circuit 76 extracts timing information from the signal $x_i$, and produces a synchronized signal that controls the samplers 70 and 72, and produces a correctly aligned spreading code, for subsequent use by a despreader circuit 77, explained below.

The adaptive filter 80, which forms a key part of the present invention, compensates for the spectrally inefficient signature waveform. The net result is that SNR of the received signal, after being processed by the adaptive linear filter 80, approaches asymptotically the SNR that would be received from a spectrally-efficient transmitted signature waveform signal, assuming a high signal to thermal noise ratio (which is usually the case for a CDMA system).

Figure 6:
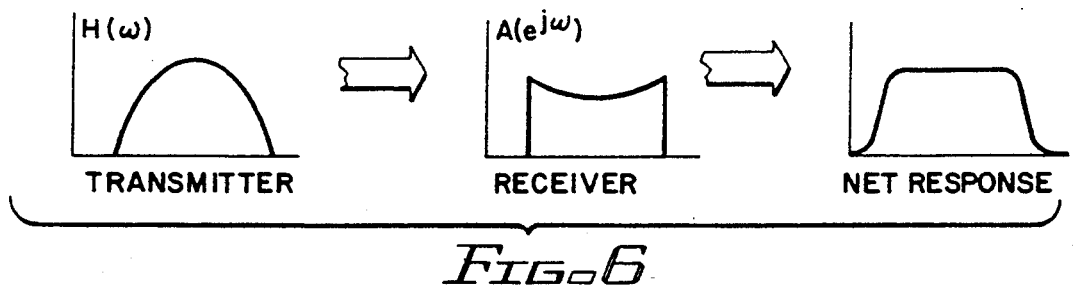
FIG. 6 conceptually illustrates the result achieved by the invention relative to the frequency domain performance of a communication system made in accordance with the present invention, and in particular illustrates how an adaptive filter, identified as $A(e^{j\omega})$, used within the receiver compensates for the spectrally inefficient performance of the transmitter.

Conceptually, the above advantage of having the SNR approach the SNR that would be received from a spectrally-efficient signature waveform signal is achieved by making the frequency-domain response of the adaptive linear filter, referred to herein as $A(e^{j\omega})$, assume a "U" shape, as shown in FIG. 6. The net result of having such a U-shaped frequency-domain response, as also shown in FIG. 6, is that it compensates for the spectrally-inefficient response of the transmitted signal, thereby rendering the power spectrum of the signal output from the adaptive filter substantially flat. A substantially flat response, in turn, maximizes the SNR, as is known in the art.

The adaptive filter 80 further compensates for signal distortions that occur in the signal $x_i$ as it traverses through the noisy medium 18 (FIG. 1). The output of the adaptive filter 80 is a series signal $Y_i$. The adaptive filter 80 is described more fully below in conjunction with FIGS. 9 and 10.

The output series from the adaptive filter 80 is decimated at an appropriate rate, $1/D$, where $D=T_C/T_H$, to yield an output series at the rate $1/T_c$, assuming that $T_H$ is as defined above. If the transmitted chip waveform is spectrally inefficient, then its bandwidth is usually greater than $1/T_c$, because there is normally some excess bandwidth. Hence, sampling must occur at a rate faster than $1/T_c$ if filtering is going to occur without aliasing. It is a feature of the present invention that sampling can occur without aliasing. However, the output $z_n$ has to occur at the chip rate $1/T_c$ so it can be correlated with $c_n$, the spreading code. To accomplish this result, the filter output $y_i$ must be decimated by $1/D$, i.e., D-1 of every D samples must be thrown out. Such decimation is provided by a suitable decimator device 75. As a result, the decimated signal $z_n$ has $N_c$ values every bit, where $N_c$ is defined as $T_B/T_C$.

After decimation has occurred, the signal is despread in a despreader circuit 77. The despreader circuit 77 is coupled to the time acquisition circuitry 76, as mentioned above. The correctly aligned spreading code for a user of interest is applied to the despreader circuit 77. When the signal is properly aligned with the signal of interest, which alignment is achieved by adjusting the time when the sampling if done by the samplers 70 and 72, it identifies where within the signal the bit times start and stop for the user of interest. Once despread, the signal is summed over the bit time using a summation circuit 78 that yields a final bit signal $G[p]$, which signal may be used as a decision statistic to determine whether the $p^{th}$ transmitted bit was a "1" or a "0".

It is noted that the simplicity of the transmitter 12 achieved by the present invention comes at the cost of somewhat increased complexity within the receiver 14, such increased complexity being manifest by the inclusion of the adaptive linear filter 80. Advantageously, the "front end" of the receiver 14 shown in FIG. 5 may be a common front end used by all the incoming signals from the numerous transmitters. Such front end includes the antenna 60, RF amplifier 62, matched filter 64, and downconverters 66 and 68. A separate "back end" of the receiver 14 would then be used for each transmitter of interest, where the back end includes the samplers 70 and 72, time acquisition circuitry 76, adaptive filter 80, decimator 75, despreader 77, and summer 78. In this way, multiple signals generated from multiple transmitters may be processed at the same time. Advantageously, because there are generally many more transmitters 12 than receivers 14, reducing the complexity of the transmitter (by allowing spectrally inefficient transmission) at the cost of additional complexity in the receiver (by addition of the adaptive filter) reduces the overall total system complexity and cost.

It is also noted that the receiver circuits (FIG. 5) may be realized in many forms. For example, each of the circuits included within the receiver 14 may be constructed from dedicated hardware circuits, comprising integrated circuits, transistors, resistors, capacitors, inductors, and other electronic components. Alternatively, the functions performed by some of the circuits can readily be carried out using a suitable processor circuit, e.g., a microprocessor circuit, controlled by a suitable control program. Moreover, for some applications, some functions included within the receiver circuits may be carried out using dedicated hardware circuits, and others may be carried out using an appropriately programmed processor circuit. It is submitted that those of skill in the art, given the description presented herein of the functions performed by such circuits and the inter-relationship between such circuits, can readily fashion such circuitry, whether realized using dedicated hardware circuits, programmed logic circuits, programmed processor circuits or combinations thereof.

Figure 7:
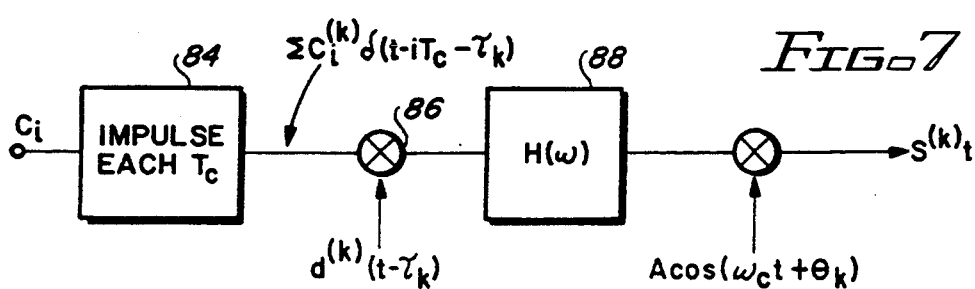
FIG. 7 depicts a model of the CDMA transmitter of the present invention.
Figure 8:
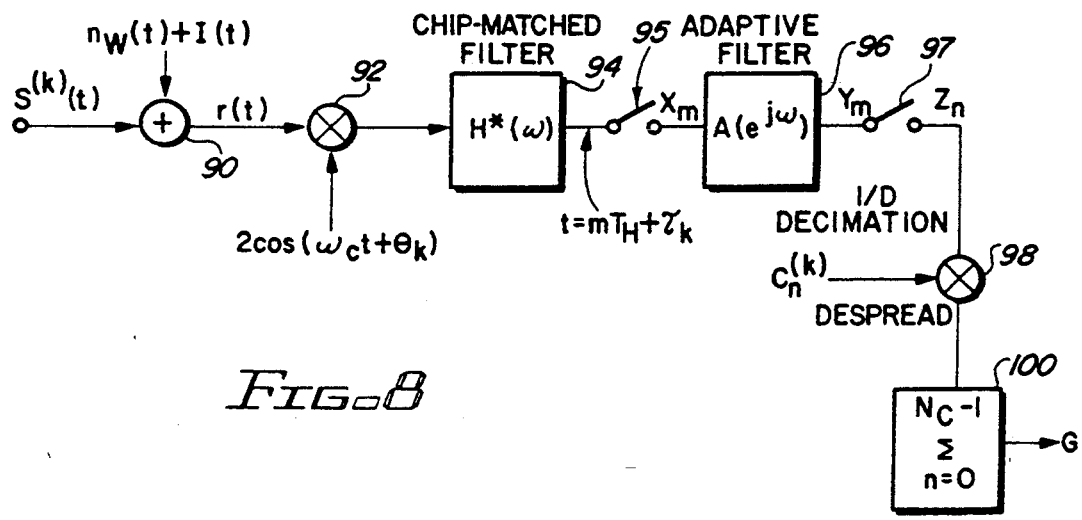
FIG. 8 illustrates a model of the CDMA receiver of the present invention.

Before describing the adaptive filter 80 in more detail, and in order to better understand the present invention, reference is next made to FIGS. 7 and 8 where there is shown a model of a transmitter and receiver, respectively, of the type that are used with the present invention. FIG. 7 depicts the model of the kth transmitter 12, assuming there are K CDMA users accessing the particular channel of interest. FIG. 8 depicts the model of the kth receiver.

The kth users' data bits, $d_i^{(k)}$ belonging to the set $\{+1, -1\}$ are defined such that $$d^{(k)}(t) = \sum_{i=-\infty}^{\infty} d_i^{(k)} p_{T_B}(t - iT_B), \tag{0}$$

where $p_T(t)=1$ for t between 0 and T, and 0 elsewhere. The impulse generator 84 generates a train of impulses of unit area, with the polarity of each impulse determined by successive elements of the spreading code $c_i^{(k)}$. These impulses are generated at the rate $1/T_C$, where the number of chips per bit, $N_C(=T_B/T_C)$, is an integer. A sequence $b_i^{(k)}$ which belongs to the set $\{+1, -1\}$, is defined as the spreading code times the data, $d^{(k)}(t-\tau_k)$, such that $$b_i^{(k)} = c_i^{(k)} d_{[i^{(k)}/N_c]}, \tag{1}$$

where the term x within the brackets [x] indicates the integer portion of x. Using this definition, it can be seen that the output of the multiplier 86 is another impulse train, given by $\Sigma b_i^{(k)}\delta(t-iT_c-\tau_k)$. This signal passes through a filter 88 having a transfer function H($\omega$). The filter H($\omega$) determines the chip waveform. Thus, for example, the system of FIG. 5 corresponds to the case where H($\omega$) is the Fourier transform of the chip waveform $P_{Tc}(t)$, illustrated as waveform 23 in FIG. 2. After passing through the filter 88, the resulting signal is multiplied by an amplitude constant A, and modulated with an RF carrier frequency $\omega_c$, such that the $k^{th}$ transmitted signal, $s^{(k)}(t)$, is given by $$s^{(k)}(t) = A\cos(\omega_c t + \theta_k) \sum_{i=-\infty}^{\infty} b_i^{(k)} h(t - iT_c - \tau_k), \tag{2}$$

where h(t) is the inverse Fourier transform of H($\omega$). It is assumed that the transmission system is band limited by the constraint $$H(\omega) = 0, \text{ for } |\omega| > \frac{\pi}{T_H} \tag{3}$$

for some constant $T_H$. Note that $T_H$ is distinct from the time between the starts of successive chip waveforms, $T_c$. It is assumed that $T_c = DT_H$ for some integer D. The integer D is thus the number of time periods $T_H$ per chip time $T_c$. The terms $\tau_k$ and $\theta_k$ are random variables that represent delays and phases that are independent and uniformly distributed in the region $[0, T_c]$ and $[0, 2\pi]$, respectively.

Turning next to FIG. 8, a model of the $k^{th}$ receiver is shown. The transmitted signal $s^{(k)}(t)$ has the AWGN and the interference I(t) from the other channels added thereto, as represented by the summing block 90. The resultant signal, r(t), received at the receiver 14 during the interval $[0, T_B]$, assuming the constant A is perceived at the receiver to be at the same level from each of the K transmitters, has the form $$r(t) = s^{(1)}(t) + I(t) + n_\omega(t), \tag{4}$$

where $n_w(t)$ is the additive white Gaussian noise (AWGN) of two-sided spectral density $\eta_0/2$, $s^{(1)}(t)$ is the desired signal term, and I(t) is the interference due to the K-1 additional users of the channel. Such interference may be expressed as $$I(t) = \sum_{k=-2}^{K} s^{(k)}(t) \tag{5}$$

where it has been assumed, without loss of generality, that user 1 is the signal of interest.

For purposes of the model given in FIG. 8, the signal is then downconverted, as represented by the multiplier 92 and the signal $2\cos(\omega_c t + \theta_k)$, and passed through a chip matched filter 94. The chip matched filter 94 has a frequency-domain response of H*($\omega$), designed to match the response H($\omega$) of the transmitter. The output of the chip matched filter is then sampled with a suitable sampler 95, at the Nyquist rate ($t = mT_H + \tau_k$), in order to yield a series $x_m$.

The series $x_m$ is applied to an adaptive linear filter 96. The adaptive linear filter 96 is a two-sided finite impulse response (FIR) filter having L taps per side. Such filter has tap coefficients $\{a_{-L}, \ldots a_L\}$ such that its discrete-time transfer function that may be expressed as $$A(e^{j\omega}) = \sum_{n=-L}^{L} a_n e^{-j\omega n}, \quad (6)$$

where $a_n$ are the tap coefficients.

The output $y_m$ of the filter 96 is decimated by a factor $1/D$ to yield a series $z_n$ (at a rate $1/T_C$). Such series in then despread, by multiplying it by the known chip sequence $c_n^{(k)}$ using the multiplier circuit 98. Assuming that the signal $c_n^{(k)}$ is properly aligned with the signal of interest, it will correlate with high magnitude (with polarity determined by the information bearing signal) with the signal from the $k^{th}$ transmitter, and correlate with small magnitude with the signals from the other K-1 transmitters, thereby facilitating detection of the signal of interest. Once despread, the signal is summed over the bit time using an appropriate summation circuit 100 to yield a final bit signal G[p], which signal may be used as a decision statistic to determine whether the $p^{th}$ transmitted bit was a "0" or a "1".

The adaptive linear filter 96 (or the filter 80 in FIG. 5) may take many forms, depending upon the particular application involved. For example, a suitable adaptive linear filter 96 that attains SNR performance nearly as good as spectrally-efficient spreading, and that is highly resistant to narrowband noise, is disclosed in Applicant's copending patent application, filed concurrently herewith, Ser. No. 08/139,957, entitled A MULTIPLE-ACCESS NOISE REJECTION FILTER FOR A DS-CDMA SYSTEM. Such copending patent application is incorporated herein by reference, including the materials incorporated by reference therein. Such materials include, which materials are also incorporated herein by reference, the following: (1) Davis et al., "Implementation of a CDMA Receiver with Multiple-Access Noise Rejection", IEEE Conference on Personal, Indoor, and Mobile Radio Communications pp. 103–107 (pub. Oct. 19, 1992); (2) Monk et al., "A Noise Whitening Approach to Multiple-Access Noise Rejection—Part I: Theory and Background (filed as Appendix A of the copending application); and (3) Davis et al., "A Noise Whitening Approach to Multiple-Access Noise Rejection—Part II: Implementation Issues" (filed as Appendix B of the copending application).

Turning next to FIG. 10, there is shown a block diagram of a CDMA system made in accordance with the present invention. As seen in FIG. 9, the system includes a downconverter 92, a matched filter 94, and a sampler 71. These elements correspond to, and perform the same function as, the matched filter 64, downconverters 66 and 68, and samplers 70 and 72 shown in FIG. 5. Note, the downconverter 92 in FIG. 9 is not shown as a quadrature downconverter. For simplicity, the carrier phase $\theta_1$ is instead assumed to be known by the receiver. This achieves the same effect.

The system shown in FIG. 9 also includes an adaptive filter 80 which is made up of two LMS gradient filters 96a and 96b, operating in parallel and independent of each other. An LMS gradient filter, as is known in the art, operates in iterative fashion. Essentially, each LMS gradient filter receives a series $x_m$ as an input, obtained from the sampler circuit 71. Each sample represents a new input signal. At the beginning of each bit time, each filter starts with a set of tap weight signals. Such tap weight signals operate on the input signal, $x_m$, and at the conclusion of the bit time, a new set of tap weight signals have been generated. A multiplexer 140 selects one of the set of tap weight signals from either the LMS gradient filter 96a or 96b as the starting tap weight signals for the next iteration. This process repeats over and over again.

To better understand the operation of the system of FIG. 9, reference is next made to FIG. 10, where there is shown a more detailed diagram of an LMS gradient filter 96. Advantageously, use of such LMS gradient filters 96a and 96b, or equivalent filters, allows the task of the transmitter 12 to be simplified while attaining SNR performance nearly as good as spectrally-efficient spreading of the same bandwidth; is highly resistant to narrowband noise; and performs the multipath mitigation function of a RAKE receiver, but does so before aliasing occurs.

The filter 96 provides a discrete time transfer function as expressed in Eq. (6), where L represents the number of taps per side of the filter. As seen in FIG. 10, the filter 96 includes a series of 2L delay elements, 120a, 120b, 120c, 120d, each providing a delay of $T_H$. Each delay element has an input signal line and an output signal line. The signal on the output signal line is delayed by $T_H$ seconds from the signal appearing at the input signal line. In a preferred embodiment of the invention, the delay $T_H$ may be one-sample delay, and the delay elements may be realized using a shift register of length m, where m is the number of delay elements used. However, it is to be understood that in other embodiments, the delay may be a known delay of $T_H$ seconds, as where, for example, the delay elements 120a, 120b, ... 120n are realized using an analog delay line.

The filter 96 in FIG. 10 illustrates a filter having L=2, thus there are four delay elements 120. As seen in FIG. 10, the input signal line of each delay element, as well as the output signal line of the last delay element, is coupled to a first series of multiplier elements 124. That is, the input signal line of delay element 120a is connected to one of the inputs of multiplier element 124a, the input signal line of delay element 120b is connected to one of the inputs of multiplier element 124b, and so on, with the output signal line of delay element 120d being connected to one of the inputs of multiplier element 124e. The other input of the multiplier element 124a is connected to the tap weight signal $a_{-2}$. Similarly, the other input of the multiplier element 124b is connected to the tap weight signal, $a_{-1}$; the other input of the multiplier element 124c is connected to the tap weight signal, $a_0$; the other input of the multiplier element 124d is connected to the tap weight signal, $a_1$; and the other input of the multiplier element 124e is connected to the tap weight signal, $a_2$. Thus, it is seen that for 2L delay elements in the filter 96, there are 2L+1 "tap signals" that represent the contents of the 2L delay elements and the input signal. These 2L+1 tap signals are connected to 2L+1 multiplier elements used with the filter. The output of each of the 2L+1 multiplier elements, e.g., the output of elements 124a, 124b, 124c, 124d and 124e, is connected to a summing circuit 126. As seen in FIG. 10, the 2L+1 delay signals are also directed to respective tap processing networks 128a, 128b, 128c, 128d, and 128e.

Each tap processing network 128a, 128b, 128c, 128d, and 128e includes, as seen in FIG. 9 for the network 128e, a first multiplier element 130, a second multiplier element 132, and a summer 134. The first multiplier element 130 receives as one of its input signals the respective tap signal. The other input signal of the first multiplier element 130 is an error correction signal 136, described below. The output of the first multiplier element 130 of each network 128 is connected to one of the inputs of the second multiplier element 132. The other input of the second multiplier element 132 is connected to receive a constant signal $\Delta$. The output of the multiplier element 132 is connected to an input of the summer 134. The summer 134 sums (i.e., accumulates) the signal applied to its input every time the tap weight signals are updated. Such sum represents the respective tap weight signal, $a_n$. This update interval is ideally once every $T_c$ seconds (every D input samples). Timing of the sampler 95 is adjusted by the time tracking provided by the timing acquisition circuit 76 so that the iteration occurs when the maximum power point of a chip waveform h(t) is present in the desired signal at the center tap of the filter 96. However, the filter, being fractionally spaced, is relatively insensitive to this timing. All that is essential is that the update of the summer 134, which constitutes an update of the "tap weight", be performed at the rate $1/T_c$ or some fraction thereof.

The output of the summing circuit 126, designated as $y_i$ in FIG. 10, is compared to a chip decision signal $b_n^{(1)}$ a comparitor circuit 138. The difference between $y_i$ and $b_n^{(1)}$ comprises the error correction signal 136 referred to above that is looped back to each of the tap processing networks 128.

In operation, i.e., at each discrete time, a tap coefficient vector $a$ may be defined as $|a_{-L}, \ldots, a_L, |^T$. At time $iT_H$, i.e., each sample time, the contents of the delay line (sequence of delay elements 120) comprise a vector $x[i] = |x_{i+L}, \ldots, x_{i-L}|^T$. Hence, if $a^n$ represents the tap coefficients at the $n^{th}$ iteration, the adaptive filter shown in FIG. 10 implements the adaptive algorithm $$a^{n+1} = a^n + \Delta x[n]\{\hat{b}_n^{(1)} - (x_T[n]a^n)\}, \tag{7}$$

where $b_n^{(1)}$ is the receiver's decision for the $n^{th}$ data-modulated chip. Such algorithm may be implemented mathematically using a suitable digital computer, or it may be implemented using discrete circuits. When the parameter $\Delta$ is appropriately selected, Eq. (7) converges to the solution:

$$R_x a = h_2^D[0], \tag{8}$$

where $$R_x = E\{x[0]x^T[0]\} \tag{9}$$

is the covariance matrix of the input signal, and where $h^D_2[0]$ is a vector of $T_H$ spaced samples of the inverse Fourier transform of the distorted pulse shape $|H(\omega)|^2 D(\omega)$, where $D(\omega)$ represents the unforeseen channel distortion. More specifically, if $h_2^D(t)$ is the inverse Fourier transform of $|(H(\omega)|^2 D(\omega)$, then $h_2^D[0]$ is the vector $|h_2^D(-LT_H) \ldots h_2^D(LT_H)|^T$. Advantageously, the tap weights obtained from the adaptive algorithm expressed above in Eq. (8) approximately maximize an average expression for SNR when the number K of CDMA users is large (more than about 5 to 10), as set forth in Davis, et al., "A Noise Whitening Approach to Multiple-Access Noise Rejection—Part II:Implementation Issues, supra. Further, the same structure also rejects narrowband noise.

Moreover, it is noted that there exists a large amount of literature that shows how to adaptively solve matrix equations like Eq. (8) using filter structures and techniques that may be completely different from that shown in FIG. 10, but which are nonetheless equivalent thereto. Any such equivalent structures could be used by the present invention.

The signal $\Delta$ is typically a constant signal, which may be obtained from a suitable generator 127, or other source. As indicated, by properly selecting $\Delta$, the convergence rate of Eq. (7) is controlled.

Use of the adaptive algorithm of Eq. (7) raises two issues. First, in a typical CDMA system, accurate chip decisions $b_i^{(k)}$ are not possible. Second, because a specific user's signal is needed to generate an error signal, the algorithm shown in Eq. (7), unlike the algorithm shown in Eq. (7) of Applicant's copending application, cannot be run directly on an RF filter which serves a set of CDMA receivers at a common site. Both of these problems are addressed by using a filter structure as shown in FIG. 10.

As described briefly above, the filter structure shown in FIG. 9 includes two parallel LMS gradient filters 96a and 96b, each of which is as described in FIG. 9. Since the spreading sequence is known to the receiver, the data-modulated chips $b^{(1)}_n$ are known to either $+c_n^{(1)}$ or $-c_n^{(1)}$. Hence, each filter 96a and 96b operates independent of the other, one assuming that $b_i^{(k)} = +c_i^{(k)}$, and the other assuming that $b_i^{(k)} = -c_i^{(k)}$. At the end of a bit time, a bit decision is used to select which set of tap signals, i.e., which set of 2L+1 tap signals, from the filter 96a or from the filter 96b will serve as the starting point for the next bit. Such bit decision is made by directing the output from each filter 96a and 96b, shown as signal lines 137a and 137b, respectively, to appropriate bit decision circuitry. Depending upon the bit decision that is made, a multiplexer 140 is controlled to select the tap signals to be used as the starting point for the next bit decision. The selected set of tap signals is applied to whichever filter 96a or 96b does not already have such tap signals therein before starting processing of the next bit.

Bit decisions may be determined as follows: both filter outputs 137a and 137b are despread by despreader 98 and summed by summer 100 to determine two decisions statistics. If each statistic indicates the same data bit, then that is the bit decision. If each indicates that the data bit was the assumed data bit (one filter assumes positive data, the other negative), then the decision statistic of greater magnitude is chosen. If each indicates that the data bit was the opposite of the assumed data bit, then that of smaller magnitude is chosen. If users 2 ... K experience similar distortion, then the tap signals determined in FIG. 9 are appropriate for all signals, and may be fed to an analog transversal filter 142 as shown in FIG. 9. Otherwise, all K receivers must run the adaptive algorithm independently.

With the two issues mentioned above addressed through use of a filter structure as is shown in FIG. 9, or equivalent structure, the equalization algorithm of Eq. (7) above offers significant advantages over the algorithm expressed in Eq. (7) of Applicant's copending application. In the copending application, the adaptive filter is designed to observe only the noise process. Thus, it assumes the shape of the signal, and trains the filter accordingly. The adaptive filter described herein, in contrast, uses the signal component within the received waveform as the basis for training the filter. Hence, if there is unforeseen channel distortion $D(\omega)$, the arriving chip signals will have Fourier transform $D(\omega)H(\omega)$ instead of $H(\omega)$. The adaptive filter described in the copending application will, in such instance, be matched to the wrong receive pulse shape. The adaptive filter described herein, however, will automatically determine the received chip shape and act accordingly. Thus, the equalization approach of the present invention is robust to unforeseen changes in the received pulse shape.

Moreover, it is noted that if the sample time is sufficient to sample h(t) without aliasing, the matching filter $H^*(\omega)$ may be dispensed with entirely, and the matching function will be automatically trained into the equalizer. In addition, a fractionally-spaced equalizer, is relatively insensitive to sample timing error. Hence, if the sample time is not exactly synchronous with the chip times, the algorithm of Eq. (7) will still find the signal in the delay line and synthesize the appropriate corrective delay. That is, the adaptive filter of the present invention performs code tracking to some degree. Such advantage is not possible with the adaptive algorithm described in Applicant's copending application, which must know the signal shape and timing a priori.

It is noted that the set of tap weight signals that maximize the SNR is provided by an equation similar to Eq. (8) above, but where the matrix $R_x$ on the left side contains only the noise terms, not the signal of interest. A key feature of the invention is the recognition that if significant multiple-access interference is guaranteed to be present, i.e., if it is known that there will be more than 5 to 10 other users, then the solution to Eq. (8) is sufficiently close to the SNR-maximizing solution, regardless of the thermal noise level.

It is further noted that when complex signal processing is carried out in the adaptive filter 80, that multiplication and addition of both of the signal components associated with such complex signal is required. Addition is straightforward. Multiplication is achieved, as shown in FIG. 11. As seen in FIG. 11, conventional (non-complex) multiplication occurs using a multiplier 150 that multiplies a first input signal by a second input signal to yield an output signal. When the signals to be multiplied are complex signals, four multipliers are required, 152, 154, 156 and 158. Each input signal has two components. Each component is applied to a respective one of the four multiplier elements. Thus, if the components of the complex signal on the first input line are $a_x$ and $a_y$, and if the components of the complex signal on the second input line are $b_x$ and $b_y$, then multiplier element 152 multiplies $b_x \cdot a_y$, multiplier element 154 multiplies $a_y \cdot b_y$, multiplier element 156 multiplies $a_x \cdot b_x$, and multiplier element 158 multiplies $a_x \cdot b_y$. The products of the multiplications performed by multipliers 154 and 156 are subtracted by subtraction element 160, and the products of the multiplications performed by multipliers 152 and 158 are added by adder 162 to yield a new complex signal, $c_x$, $c_y$.

Thus, it is seen that the present invention provides a simplified DS-CDMA system that achieves a high SNR, despite the noisy channels and mediums through which the transmitted signal traverses as it propagates from the transmitter to the receiver, and despite signal or channel distortion that may be present due, e.g., to multiple signal paths. It is further seen that such a DS-CDMA system significantly simplifies the transmitter circuits by eliminating the need for flat-spectrum pulses, by using a receiver that compensates for the spectrally-inefficient shape of the transmitted pulse.

It is further seen that the present invention provides a receiver for use within a CDMA system that uses a minimum chip-MSE equalizer to improve bit-SNR in the presence of sufficient multiple access noise. It is also seen that such CDMA receiver adaptively performs the multipath mitigation function of a RAKE receiver, but does so before aliasing occurs.

While the invention herein disclosed has been described by means of specific embodiments and applications thereof, numerous modifications and variations could be made thereto by those skilled in the art without departing from the scope of the invention set forth in the claims.

What is claimed is:

1. A direct-sequence multiple-access code division (DS-CDMA) communication system comprising:

a multiplicity of transmitters, each of said transmitters including:

means for generating a CDMA waveform signal, said CDMA waveform signal comprising an RF carrier signal modulated with an informational data signal comprising a sequence of data bits, each data bit having a bit time of $T_B$, and each data bit being modulated with a waveform signature signal, said waveform signature signal comprising a train of $N_c$ chip pulses, each chip pulse being separated from an adjacent chip pulse by $T_c$ seconds such that $N_C \cdot T_C = T_B$, each chip pulse of said train of chip pulses having an amplitude set by a binary spreading code unique to each transmitter;

means for transmitting the CDMA waveform signal from each of said multiplicity of transmitters so that the chip pulses are transmitted having a spectrally inefficient, substantially non-flat, power spectrum within the band $\pm 1/T_C$; and a receiver comprising:

means for receiving the CDMA waveform signals transmitted from each of said multiplicity of transmitters and stripping the RF carrier signal therefrom, thereby leaving a data input signal to said receiver that comprises said sequence of data bits, with each data bit being modulated with the waveform signature that is unique to each transmitter;

sampling means for sampling the data input signal at a prescribed sampling rate to produce a series signal $x_m$;

adaptive filter means coupled to receive said series signal $x_m$ and subject it to a prescribed transfer function that produces a filtered output signal $y_m$, said transfer function being adapted to compensate for the spectrally inefficient substantially non-flat power spectrum of the transmitted chip pulses within the band $\pm 1/T_C$, thereby improving the signal-to-noise ratio (SNR) of the signal $y_m$, and said transfer function further being adapted to compensate the series signal $x_m$ for signal distortions caused by multiple signal paths of the CDMA waveform signal as it is transmitted from the transmitter to the receiver;

decimator means for decimating the filtered output signal $y_m$ by a prescribed decimation factor D to produce a decimated series signal $z_n$;

timing acquisition means responsive to the series signal $x_m$ for generating the binary spreading code of a user of interest and a timing signal that controls when within a data bit of said data input signal the sampling means samples the data input signal;

despreading means connected to said decimator means and responsive to said timing signal for identifying the beginning and ending points of a data bit within said series signal $z_n$ that originates with said user of interest by multiplying the series signal $z_n$ by an aligned spreading code $c_n$; and accumulation means for summing said series signal $z_n$, as aligned by the spreading code $c_n$, over the data bit to produce a data decision signal.

2. The DS-CDMA system as set forth in claim 1 wherein said means for receiving the CDMA waveform signals includes a matched filter through which the received CDMA signals pass, said matched filter having a frequency response $H^*(\omega)$ that matches the power spectrum of the transmitted chip pulses.

3. The DS-CDMA system as set forth in claim 2 wherein said means for receiving the CDMA waveform signals further includes quadrature downconversion means for stripping the RF carrier from the received CDMA system and producing first and second data input signals, the first data input signal containing one component of a complex signal, and the second data input signal containing another component of the complex signal.

4. The DS-CDMA system as set forth in claim 3 wherein said sampling means comprises first and second sampling means, the first sampling means sampling the first data input signal, and the second sampling means sampling the second data input signal.

5. The DS-CDMA system as set forth in claim 1 wherein the means for transmitting the CDMA waveform signal using a spectrally inefficient substantially non-flat power spectrum within the band $\pm 1/T_C$ comprises a square wave generator that generates a square wave having a period equal to said chip separation time, $T_C$, and that modulates said square wave with said binary spreading code to produce said waveform signature, a low pass filter having a cut off frequency at about $1/T_C$, said waveform signature being passed through said low pass filter.

6. The DS-CDMA system as set forth in claim 2 wherein the adaptive filter of said receiver includes a two-sided finite impulse response (FIR) filter of L taps per side.

7. The DS-CDMA system as set forth in claim 6 wherein said adaptive filter includes first and second FIR filters, each receiving the sampled input data signal, $x_m$, and each generating an signal $y_m$ from which separate data decision signals may be generated, and each having feedback means for applying a set of starting tap signals to a selected one of said first or second FIR filters at the beginning of a new bit processing time that is the same as a set of ending tap signals present in the other of said first or second FIR filters at the conclusion of a most recent bit processing time.

8. The DS-CDMA system as set forth in claim 7 wherein each of said first and second FIR filters comprises a sequence of delay elements that delay an incoming signal by a prescribed amount, $T_H$; a tap point being provided on each side of each delay element; and further including a series of multiplier elements that multiply a signal from each tap point by a respective tap coefficient signal, with the resulting output signals from said multiplier elements being summed to produce said filtered output signal; and further including tap coefficient signal generating means for generating a set of tap coefficient signals in accordance with a prescribed function of a tap point signal from a respective tap point, a control parameter $\Delta$, and said filtered output signal; said prescribed function being selected to produce a set of tap coefficient signals that maximize an average SNR of the signal $y_m$.

9. The DS-CDMA system as set forth in claim 8 wherein said prescribed function used by said tap coefficient generating means to generate said set of tap coefficient signals comprises $\Sigma$, summed over a prescribed period of time, where $S_1$ is the tap point signal appearing at a respective tap point, $S_2$ is said filtered output signal, and $S_3$ is said control parameter $\Delta$.

10. A direct-sequence multiple-access code division (DS-CDMA) communication system comprising:

a multiplicity of transmitters, each of said transmitters including:

a CDMA waveform signal generator that generates a CDMA waveform signal, said CDMA waveform signal comprising an RF carrier signal modulated with a first bandwidth informational data signal comprising a sequence of data bits, each data bit having a bit time of $T_B$, and each data bit being modulated with a second bandwidth waveform signature signal, said waveform signature signal comprising a train of $N_C$ chip pulses, each chip pulse being separated from an adjacent chip pulse by $T_C$ seconds such that $N_C \cdot T_C = T_B$, each chip pulse of said train of chip pulses having an amplitude set by a binary spreading code unique to each transmitter;

a transmitter that transmits the CDMA waveform signal from each of said multiplicity of transmitters so that the chip pulses are transmitted having a spectrally inefficient substantially non-flat power spectrum within a band $\pm 1/T_C$; and a receiver comprising:

an RF receiver that receives the CDMA waveform signals transmitted from each of said multiplicity of transmitters and strips the RF carrier signal therefrom, thereby leaving a data input signal to said receiver that comprises said sequence of data bits, with each data bit being modulated with the waveform signature that is unique to each transmitter;

a sampling circuit that samples the data input signal at a prescribed sampling rate to produce a series signal $x_m$;

an adaptive filter coupled to receive said series signal $x_m$ and subject it to a prescribed transfer function that produces a filtered output signal $y_m$, said transfer function being adapted to compensate for the spectrally inefficient substantially non-flat power spectrum of the transmitted chip pulses within the band $\pm 1/T_C$, and to compensate the series signal $x_m$ for signal distortions caused by multiple signal paths of the CDMA waveform signal as it is transmitted from the transmitter to the receiver;

a decimator circuit that decimates the filtered output signal $y_m$ by a prescribed decimation factor D to produce a decimated series signal $z_n$;

timing acquisition means responsive to the series signal $x_m$ for generating the binary spreading code of a user of interest and a timing signal that controls when within a data bit of said data input signal the sampling means samples the data input signal;

a despreading circuit connected to said decimator circuit and responsive to said timing signal that identifies the beginning and ending points of a data bit within said series signal $z_n$ that originates with said user of interest and that multiplies the series signal $z_n$ by an aligned spreading code $c_n$; and an accumulator that accumulates the series signal $z_n$, as multiplied by the spreading code $c_n$, over the data bit to produce a data decision signal.

11. A fractionally-spaced equalizer for use within a receiver of a code-division multiple-access (CDMA) communication system, said CDMA communication system including a multiplicity of transmitters adapted to transmit data bit signals to said receiver, each transmitter of said multiplicity of transmitters having means for modulating its transmitted data bits with a prescribed signature waveform, each transmitter further having its data bit signals transmitted having a spectrally inefficient, substantially non-flat, power spectrum within a band $\pm 1/T_C$, where $T_C$ is a chip time associated with the prescribed signature waveform, said equalizer comprising:

a series of 2L delay elements, where L is a positive integer, each for delaying an input signal applied to an input port thereof by an amount $T_H$, a first delay element having an input port to which the input signal is applied, and an output port connected to the input port of an adjacent delay element, whereby the input signal is delayed by a total delay of $2LT_H$ as it is passed through said series of delay elements from the first delay element to a second delay element, from the second delay element to a third delay element, and so on, to the last delay element, each of said delay elements having a tap point on both sides thereof, whereby $2L+1$ tap points are provided;

means for coupling a transmitted data bit signal received by said receiver to the input port of the first delay element;

a series of $2L+1$ multiplier elements, each multiplier element of said series of $2L+1$ multiplier elements having first and second input ports and an output port, with the signal at the output port being the product of the signals applied to the first and second input ports, the first input port of each multiplier element of said first series being connected to a respective tap point;

an accumulation circuit having $2L+1$ input terminals and an output terminal, said accumulation circuit providing a sum signal at its output terminal that is the sum of the signals applied to each of its $2L+1$ input terminals, said $2L+1$ input terminals being connected to the output port of a corresponding one of said first series of $2L+1$ multiplier elements;

a series of $2L+1$ tap processing networks, each network of said series of $2L+1$ tap processing networks having first, second, and third input terminals, and an output terminal, the output terminal providing a signal that represents a prescribed function of signals applied to the first, second, and third input terminals, said first input terminal being connected to the tap point of a respective one of said $2L+1$ delay elements, the second input terminal being connected to an error signal, the third input terminal being connected to a fixed control signal, and the output terminal being connected to the second input port of a respective one of said first series of $2L+1$ multiplier elements;

a difference circuit having a negative input terminal, a positive input terminal, and an output terminal, a difference signal being provided at its output terminal that represents the difference between a signal applied to the negative input terminal and a signal applied to the positive input terminal, the negative input signal of said difference circuit being connected to the output terminal of the summation circuit, the positive input terminal being connected to a signal representative of a prescribed chip waveform associated with a known user of said CDMA system, and the output terminal being applied to the second input terminal of each of said $2L+1$ tap processing networks, the difference signal generated by said difference circuit thereby comprising said error signal;

the signal appearing at the output terminal of said accumulation circuit representing an output signal of said fractionally-spaced equalizer;

the combination of signals appearing at the respective output terminals of the $2L+1$ tap processing networks comprising a set of tap weight signals that adaptively tune said fractionally-spaced equalizer to compensate for the spectrally inefficient, substantially non-flat, power spectrum of the transmitted data bit signals; and means for setting the fixed control signal applied to the second input terminal of the 2L tap processing networks to a value that maximizes the signal-to-noise ratio of the output signal.

12. The fractionally-spaced equalizer as set forth in claim 11 wherein said means for coupling a transmitted data bit signal received by said receiver to the input port of the first delay means comprises:

a matched filter through which the transmitted data bit signal passes, said matched filter having a frequency response adapted to match the power spectrum of the transmitted data bit signal; and sampling means for sampling the transmitted data bit signal at a prescribed sampling rate, thereby producing a sampled series $x_m$ that is applied to the input port of the first delay means.

13. The fractionally-spaced equalizer as set forth in claim 11 wherein said series of 2L delay means comprises a delay line having at least $2L+1$ tap points, with the signal appearing at each tap point being delayed $T_H$ from the signal appearing at a prior tap point.

14. The fractionally-spaced equalizer as set forth in claim 13 wherein said series of 2L delay means comprises a shift register of length 2L, said shift register being clocked at a rate of $1/T_H$ so as to shift the contents held in each register to an adjacent register every $T_H$ seconds.

15. The fractionally-spaced equalizer as set forth in claim 11 wherein the prescribed function that defines the output terminal of said tap processing networks as a function of the signals applied to the first, second, and third input terminals comprises $\Sigma[(S_1 \times S_2) \times S_3]$, accumulated over a prescribed period of time, where $S_i$ represents the signal applied to the $i^{th}$ input terminal.

16. The fractionally-spaced equalizer as set forth in claim 15 wherein the prescribed period of time over which the signals $S_i$ are accumulated in accordance with the prescribed function comprises a period of a data bit within said data signal.

17. An adaptive filter for use within a receiver of a code-division multiple-access (CDMA) communication system, said CDMA communication system including a multiplicity of transmitters, each adapted to transmit a data bit signal to said receiver, and each transmitter having means for modulating the individual bits of its transmitted data bit signal with a prescribed chip waveform, and each transmitter further having its data bit signal transmitted having a spectrally inefficient, substantially non-flat, power spectrum within a band $\pm 1/T_C$, where $T_C$ is a chip time associated with the prescribed chip waveform, said adaptive filter comprising:

first and second digital filters, each having a signal input port, a signal output port, an error signal port, and a set of signal tap ports, each further having means for processing an input signal applied to its input port in accordance with a prescribed discrete transfer function to produce an updated output signal as a function of prior signals present at its signal output port, error signal port, and signal tap ports, with the set of signal tap ports of each digital filter being adapted to compensate for the spectrally inefficient, substantially non-flat, power spectrum of the transmitted data bit signal;

first and second comparison circuits, each having a first input terminal, a second input terminal, and an output terminal, and each providing an error signal that appears at its output terminal as a function of the relationship between signals applied to its first and second input terminals, the first input terminal of each comparison circuit being connected to the output port of a corresponding one of said first and second digital filters, and the output terminal of each comparison circuit being connected to the error signal port of a corresponding one of said first and second digital filters, the second input terminals of each comparison circuit being coupled to a positive reference chip signal and a negative reference chip signal, respectively;

a multiplexer circuit having first and second sets of input terminals, a set of output terminals, and a control terminal, with the set of output terminals being switchably connected to a selected one of the first or second sets of input terminals as a function of a control signal applied to said control terminal, said first and second sets of input terminals being connected respectively to the first and second sets of signal tap ports of the first and second digital filters, and said set of output terminals also being connected to the first and second sets of signal tap ports of both said first and second digital filters, whereby a selected one of the set of tap signals present in said first and second digital filters at the conclusion of a processing time interval is used by both of said first and second digital filters at the beginning of a next processing time interval;

means for coupling the transmitted data bit signal received at said receiver to the input signal port of both of said first and second fractionally-spaced equalizers; and means for generating said control signal as a function of a most recent bit decision of said transmitted data bit signal.

18. The adaptive filter as set forth in claim 17 wherein said means for coupling the transmitted data bit signal received at said receiver to the input signal port of both of said first and second fractionally-spaced equalizers comprises:

a matched filter that filters the received transmitted data bit signal;

a sampling circuit that samples the received transmitted data bit signal after it has passed through said matched filter means at a sampling rate that is at least equal to the Nyquist rate; and means for connecting the sampled data bit signal to the input signal port of both of said first and second fractionally-spaced equalizers.

19. The adaptive filter as set forth in claim 18 wherein said matched filter has a frequency response $H^*(\omega)$ adapted to match the spectrally inefficient, substantially non-flat, power spectrum of the transmitted data bit signal.

20. The adaptive filter as set forth in claim 19 wherein said means for coupling the transmitted data bit signal received at said receiver to the input signal port of both of said first and second fractionally-spaced equalizers further includes a downconversion circuit for removing an RF carrier signal from said transmitted data bit signal prior to presenting said signal to said matched filter means.

21. The adaptive filter as set forth in claim 17 further including other filter means $A(\omega)$ coupled to receive the transmitted data bit signal from others of said multiplicity of transmitters, the set of output terminals of said multiplexer circuit being coupled to said other filter means, whereby the set of tap signals selected by said multiplexer circuit may be used to control the response of said other filter means.

22. A method of detecting with a maximized signal-to-noise ratio (SNR) whether the bits of a transmitted data sgnal used within a code-division multiple access (CDMA) communications system represent a digital "1" or a digital "0", said CDMA communications system including a plurality of transmitters, each of which includes means for transmitting data signals at the same data rate and bandwidth as may be transmitted by others of the transmitters at the same time, and a base-station receiver adapted to receive said transmitted data signals, said method comprising the steps of:

(a) generating a sequence of chip pulses that define a unique chip sequence within each bit time of the data signal to be transmitted, said unique chip sequence serving to identify a particular transmitter from which the transmitted signal originates;

(b) shaping the chip pulses of each sequence of chip pulses generated in step (a) so that each has a spectrally inefficient, substantially non-flat, power spectrum within a band $\pm 1/T_C$, where $T_C$ is a chip time between the chip pulses of the sequence of chip pulses;

(c) transmitting the sequence of chip pulses shaped in step (b) as part of each data bit that is transmitted by the particular transmitter, whereby each data bit transmitted is encoded with said unique chip sequence;

(d) receiving the sequence of chip pulses at the receiver;

(e) passing the sequence of chip pulses received in step (d) through a matched filter, said matched filter having a frequency response adapted to match the powr spectrum of the transmitted chip pulses;

(f) sampling the sequence of chip pulses passed through the matched filter in step (e) at a Nyquist rate to produce a sampled series of pulses, $x_m(i)$;

(g) passing the sampled series of pulses, $x_m(i)$, through a first fractionally spaced equalizer adapted to produce a sequence of pulses $y_m(i)$, said first fractionally-spaced equalizer being configured to exhibit a frequency response that compensates for the spectrally inefficient, substantially non-flat shape of the power spectrum of the transmitted pulses, and to adaptively compensate for signal distortions that occur in said sequence of chip pulses while enroute to said receiver, so as to produce a net frequency response for the series of pulses $y_m(i)$ that is substantially flat over all frequencies of interest, thereby maximizing the SNR of the series $y_m(i)$, and that automatically compensates for signal distortions; and (h) determining whether the sequence of pulses $y_m(i)$ represents a data bit that is a digital "1" or a digital "0".

23. The method as set forth in claim 22 further including:

passing the sampled series of pulses, $x_m(i)$, through a second fractionally spaced equalizer adapted to produce a sequence of pulses $y_m(i)$, said second fractionally-spaced equalizer being configured the same as the first fractionally spaced equalizer, each of said first and second fractionally spaced equalizers generating a set of tapped weights that are used by said fractionally spaced equalizer as it converts the sampled series of pulses $x_m(i)$ to a sequence of pulses $Y_m(i)$;

comparing the sequence of pulses output from the first of said fractionally-spaced equalizers with a positive reference sequence of chip pulses, and comparing the sequence of pulse output from the second of said fractionally-spaced equalizers with a negative sequence of chip pulses, and determining which of said first or second fractionally-spaced equalizers has more accurately detected the bit of the transmitted data signal; and selecting one of the set of tap weights generated by said first fractionally spaced equalizer or said second fractionally spaced equalizer for use by both said first and second fractionally spaced equalizers when processing a next bit of the transmitted data signal as a function of which of said first or second fractionally spaced equalizers accurately detected the current bit of the transmitted data signal.

* * * * *

UNITED STATES PATENT AND TRADEMARK OFFICE
CERTIFICATE OF CORRECTION

PATENT NO. : 5,377,226
DATED : December 27, 1994
INVENTOR(S) : Mark E. Davis

It is certified that error appears in the above-identified patent and that said Letters Patent is hereby corrected as shown below:

On the title page item

[21] Application Number "139,961" instead of "339,961".

Signed and Sealed this

Third Day of February, 1998

Attest:

BRUCE LEHMAN

*Attesting Officer*     *Commissioner of Patents and Trademarks*